(12) United States Patent
Asao et al.

(10) Patent No.: US 7,340,821 B2
(45) Date of Patent: Mar. 11, 2008

(54) STATOR AND RESOLVING METHOD AND DEVICE THEREOF

(75) Inventors: Yoshihito Asao, Tokyo (JP); Kyouhei Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 369 days.

(21) Appl. No.: 11/038,143

(22) Filed: Jan. 21, 2005

(65) Prior Publication Data

US 2005/0172477 A1 Aug. 11, 2005

Related U.S. Application Data

(62) Division of application No. 10/635,611, filed on Aug. 7, 2003.

(30) Foreign Application Priority Data

Oct. 8, 2002 (JP) ............... P2002-295177

(51) Int. Cl.
*H02K 15/00* (2006.01)
*B23P 19/00* (2006.01)

(52) U.S. Cl. ............ 29/596; 29/426.5; 29/597; 29/598; 29/602.1; 29/762; 310/254; 310/259; 310/216; 310/217; 310/218

(58) Field of Classification Search .......... 29/605, 29/606, 732, 735, 736, 596, 597, 598, 602.1, 29/604, 607, 734, 762, 426.1, 426.4, 426.5, 29/426.6; 310/254, 259, 216, 217, 218; 241/1–30

See application file for complete search history.

(56) References Cited

U.S. PATENT DOCUMENTS 4,508,583 A * 4/1985 Beavers et al. ............... 156/94
6,317,962 B1 * 11/2001 Adachi et al. ............... 29/596

FOREIGN PATENT DOCUMENTS

| EP | 087231 A2 * | 10/1998 |
|---|---|---|
| EP | 1223657 A1 | 7/2002 |
| JP | 5-138453 A | 6/1993 |
| JP | 11-4564 A | 1/1999 |
| JP | 11-75334 A | 3/1999 |
| JP | 2001-251819 A | 9/2001 |
| JP | 2001-298885 A | 10/2001 |

OTHER PUBLICATIONS

Computer translation of JP 05-138453 A.*

* cited by examiner

*Primary Examiner*—Peter Vo
*Assistant Examiner*—Michael T Hess
(74) *Attorney, Agent, or Firm*—Sughrue Mion, PLLC

(57) ABSTRACT

The method for resolving the stator having a coil disposed in the slots provided around an inner circumferential face of a cylindrical iron core and having an opening portion includes a step of enlarging the opening portion of the slot, and a step of extracting the coil from the slot.

4 Claims, 11 Drawing Sheets

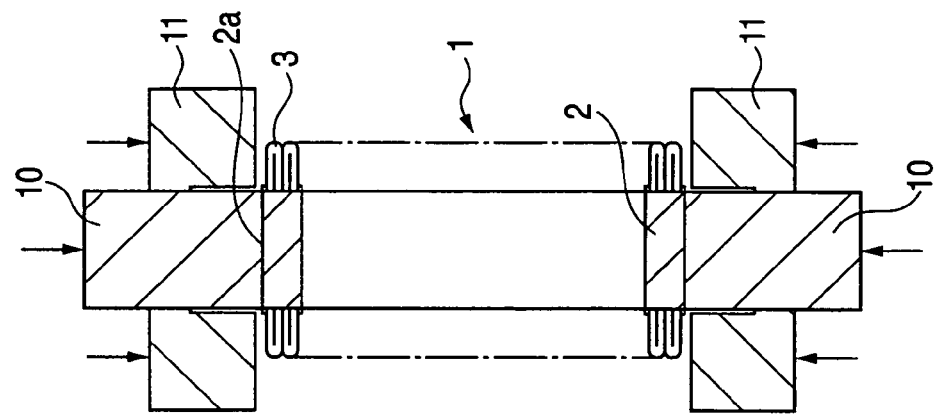
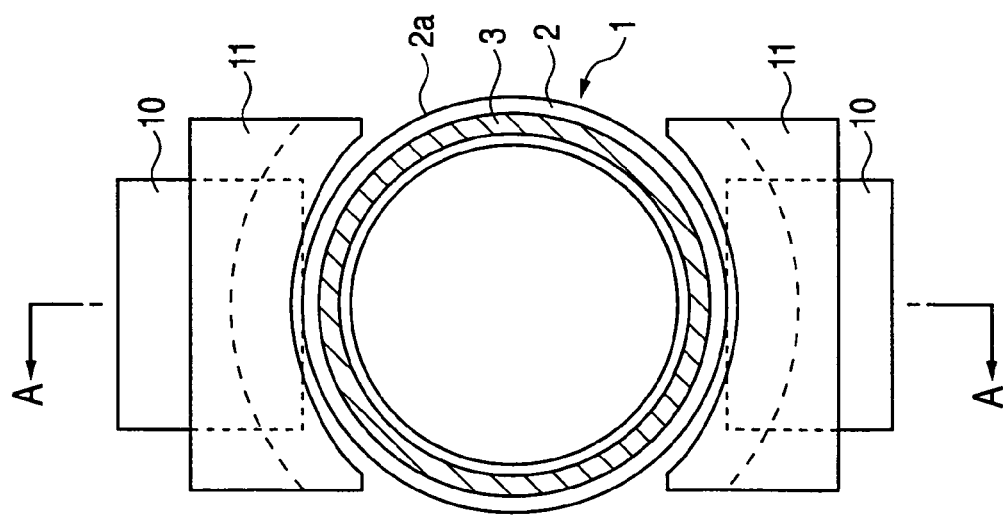

STATOR AND RESOLVING METHOD AND DEVICE THEREOF

This is a divisional of application Ser. No. 10/635,611, filed Aug. 7, 2003. The above noted prior application is hereby incorporated by reference.

BACKGROUND OF THE INVENTION

1. Field of the Invention

The present invention relates to a stator, and a method and device for resolving the stator, in which the coil is easily resolved.

2. Description of the Related Art

A conventional method for resolving the stator included deleting an iron core projection forming a bottleneck opening of slot in an iron core middle hole, pressing a coil end portion exposed out of the iron core at one end of the iron core toward the center of iron core around the entire circumference to extrude the coil side out of the slot into the iron core middle hole, reducing an apparent outer diameter of coil at the end portion of the coil under the iron core middle hole, and pressing the coil end portion in an axial center direction to extract the coil out of the iron core middle hole to separate the iron core of the stator and the coil (e.g., refer to document 1). Another conventional method for resolving the stator for an AC dynamo for vehicle was disclosed, including a step of cutting a part of one transition portion of a stator iron core in an axial direction, and a step of pulling out an electrical conductor in the axial direction. Moreover, the stator for AC dynamo was disclosed in which the stator windings are not impregnated with resin, whereby the stator iron core and the stator windings are easily separated to be reusable (e.g., refer to document 2).

[Document 1]
JP-A-5-138453 (pages 2 and 3, FIG. 1)
[Document 2]

The method for resolving the stator as disclosed in JP-A-5-138453 had the problem that it took a longer time to resolve the stator, because the iron core projection forming the bottleneck opening of slot was deleted, and when the coil was treated with varnish, the resolving efficiency was lower, because the coil was not simply taken out of the iron core. Also, the method for resolving the stator as disclosed in JP-A-11-75334 had the problem that the coil had a lower yield of withdrawal, because the coil needed to be cut out, and when the coil was treated with varnish, the resolving efficiency was lower, because the coil was not simply taken out of the iron core. Furthermore, the stator having the coil impregnated with resin or treated with varnish had the problem that the coil was degraded in the insulating property or vibration resistance in the AC dynamo for vehicle to be employed in the severe environments, even though it was easily resolved.

SUMMARY OF THE INVENTION

This invention has been achieved to solve the above-mentioned problems, and it is an object of the invention to provide a stator in which a coil is easily resolved, and a method and device for resolving the stator in which the coil can be withdrawn in a short time with a excellent yield.

The present invention provides a stator including a cylindrical iron core, slots and a coil disposed in the slots.

A portion with a lower radial crushing strength is provided in at least a part of the iron core in a circumferential direction. The slot is provided around an inner circumferential face of the cylindrical iron core and including an opening portion.

Also, this invention provides a method for resolving a stator including a step of enlarging the opening portion of the slot, and a step of extracting the coil from the slot. The stator including a coil disposed in the slots provided around an inner circumferential face of a cylindrical iron core and including an opening portion.

Also, this invention provides a method for resolving a stator including a step of dividing the iron core in a circumferential direction, and a step of extracting the coil from the slot. The stator including a coil disposed in the slots provided around an inner circumferential face of a cylindrical iron core and including an opening portion.

Also, this invention provides a device for resolving a stator including an enlarging section and an extracting section. The enlarging section enlarges the opening portion of the slot. An extracting section extracts the coil from the slot. The stator including a coil disposed in the slots provided around an inner circumferential face of a cylindrical iron core and including an opening portion.

Also, this invention provides a device for resolving a stator including a dividing section and an extracting section. The dividing section divides the iron core in a circumferential direction. The extracting section extracts the coil from the slot. The stator including a coil disposed in the slots provided around an inner circumferential face of a cylindrical iron core and including an opening portion.

BRIEF DESCRIPTION OF THE DRAWINGS

These and other objects and advantages of this invention will become more fully apparent from the following detailed description taken with the accompanying drawings in which:

FIGS. 5A and 5B are explanatory views for explaining a step of enlarging an opening portion of slot and extracting the coil from the slot and means according to an embodiment 2 of this invention;

DETAILED DESCRIPTION OF THE INVENTION

Embodiment 1

Figure 1A:
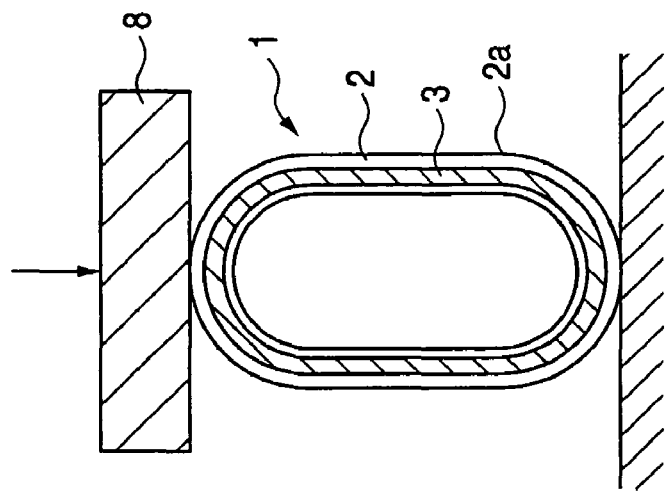
FIGS. 1A to 1C are explanatory views for explaining a step of enlarging an opening portion of slot and enlarging section according to an embodiment 1 of this invention.
Figure 1B:
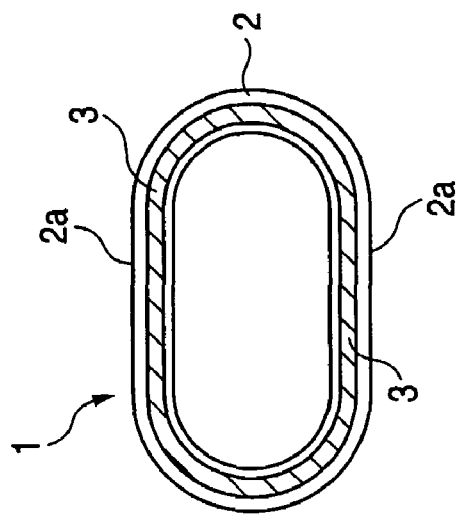
Figure 1C:
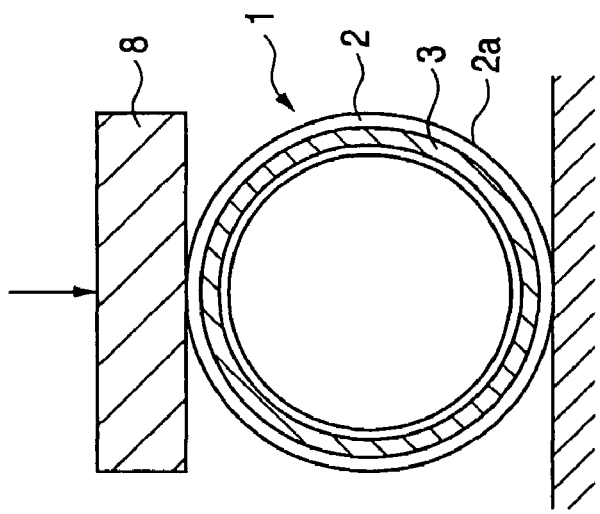
Figure 2:
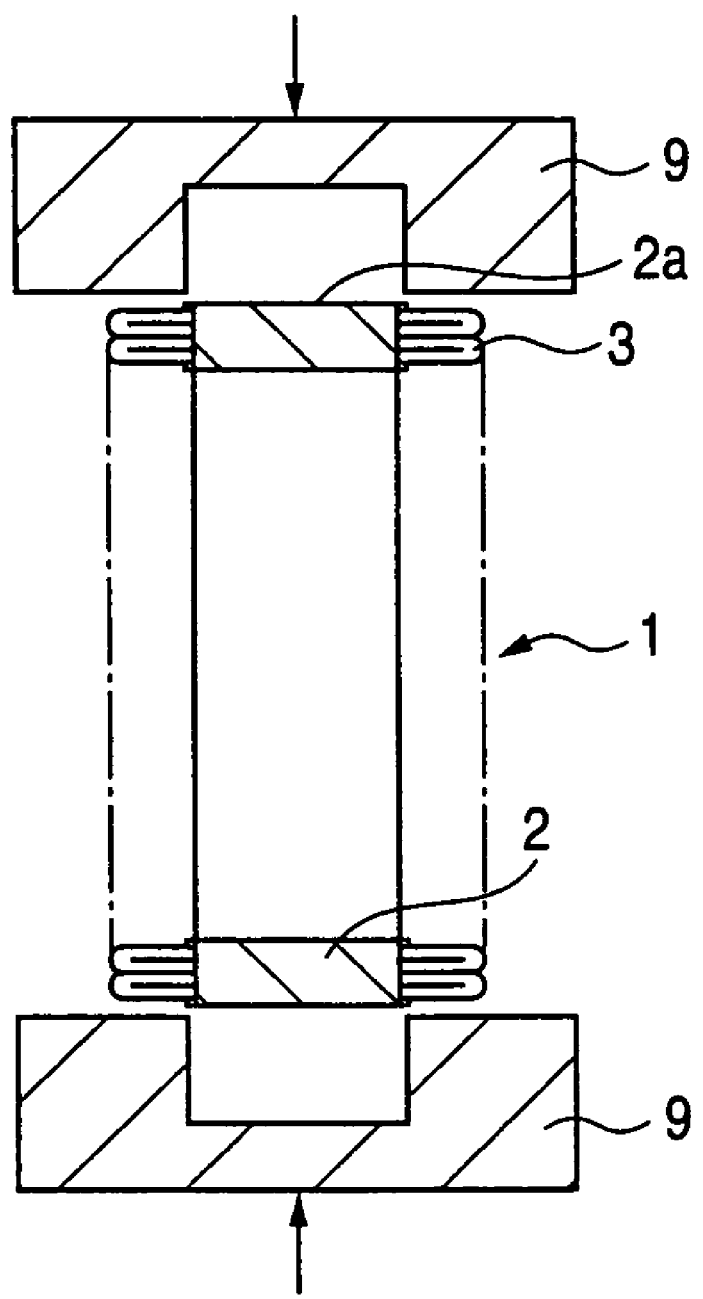
FIG. 2 is an explanatory view for explaining a step of extracting the coil from the slot and extracting section according to the embodiment 1 of this invention.
Figure 3:
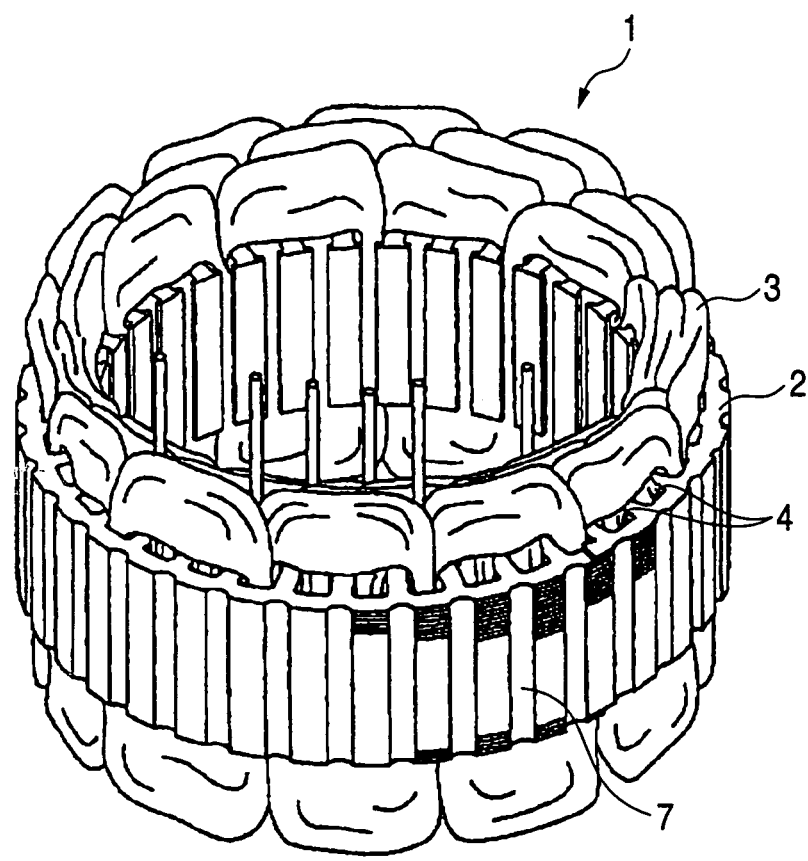
FIG. 3 is a perspective view of a stator in an AC dynamo for vehicle.
Figure 4:
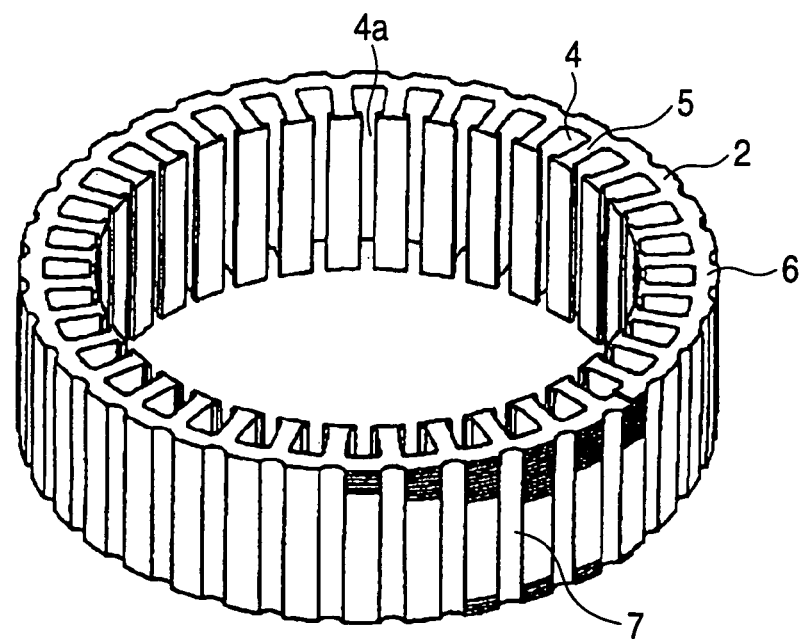
FIG. 4 is a perspective view of an iron core for the stator in the AC dynamo for vehicle.

Referring to FIGS. 1A to 4, an embodiment 1 of this invention will be described below. The same or like parts are designated by the same numerals throughout the figures. FIG. 3 is a perspective view of a stator in an AC dynamo for vehicle, and FIG. 4 is a perspective view of an iron core. FIGS. 3 and 4 are the same views as FIGS. 6A and 8 disclosed in JP-A-9-103052. In FIGS. 3 and 4, a stator 1 has the iron core 2 and a coil 3, the iron core 2 being formed cylindrically by helically winding a band plate cut out from a strip steel plate. The iron core 2 has a plurality of slots 4 and teeth 5 around its inner circumferential face, each slot 4 having an opening portion 4a. A core back 6 of the iron core 2 has the concave portions 7 corresponding to the number and size of slots. The coil 3 of copper wire windings is inserted into the slots 4 of the iron core 2 through the opening portions 4a, and treated with varnish, whereby the stator 1 is built into the AC dynamo for vehicle.

FIG. 1A to 1C are explanatory views for explaining a step of enlarging the opening portion of slot and enlarging section. When the coil 3 of the stator 1 is resolved to recycle the copper wire, the stator 1 is pressed via the plate 8 by a press, as shown in FIG. 1A, whereby a part of the outer circumferential face 2a of the iron core 2 is formed like plane, as shown in FIG. 1B. FIG. 2 is an explanatory view for explaining a step of extracting the coil from the slot and extracting section. The part of the coil 3 for which the outer circumferential face 2a of the iron core 2 is formed like plane in FIG. 1B is pressed to the inner circumference from both axial end faces of the iron core 2 at the same time, employing a coil extracting jig 9. Moreover, there is a step of rotating the stator 1 relative to the pressing direction as shown in FIGS. 1B and 1C, with rotator consisting of a motor. The other part of the coil 3 where the outer circumferential face 2a of the iron core 2 is not formed like plane in FIG. 1B has the outer circumferential face 2a formed like plane in the same manner as in FIG. 1B by rotating the stator 1 and pressing the plate 8 by press, as shown in FIG. 1C, and pressed again by the press, employing the coil extracting jig 9.

Since the outer circumferential face 2a of the cylindrical iron core 2 is formed like plane as above described, the opening portion 4a of the slot 4 is easily enlarged, so that the coil 3 is likely to be extracted without interference. Also, since the coil 3 on both end faces of the iron core 2 is pressed at the same time, the coil 3 is surely extracted in a short time. Furthermore, since a step of rotating the stator 1 is provided, the coil 3 is likely to be extracted as a whole, resulting in an excellent yield. In this manner, since a step of enlarging the opening portion 4a of the slot 4 and a step of extracting the coil 3 are provided, the opening portion 4a is enlarged even when it is narrow, whereby the coil 3 is extracted easily and surely in a short time. When the varnish treatment is made, there is especially the great effect, whereby the iron core 2 and the coil 3 are unfixed and the coil 3 is more likely to be extracted.

Also, since there are provided enlarging section for enlarging the opening portion 4a of the slot 4 by pressing the outer circumferential face 2a of the iron core 2 by the press and extracting section for extracting the coil 3 from the slot 4 by employing the coil extracting jig 9, the opening portion 4a is easily enlarged, and the coil 3 is easily extracted through the enlarged opening portion 4a, whereby the resolving device is simple and reduced in size. Also, since there is provided rotator for rotating the position of the stator 1 relatively, the stator 1 is rotated to enlarge the opening portion 4a, and extract the coil 3, whereby the coil 2 is likely to be extracted as a whole, resulting in the resolving device of small size and with excellent yield.

Embodiment 2

Referring to FIGS. 5A and 5B, an embodiment 2 of this invention will be described below. FIGS. 5A and 5B are explanatory views for explaining a step of enlarging the opening portion of slot and extracting the coil from the slot and means thereof. FIG. 5A is a front view, and FIG. 5B is a cross-sectional view taken along the line A-A in FIG. 5A. In FIGS. 5A and 5B, there are provided a pressing jig 10 for pressing the outer circumferential face 2a of the stator 1 toward the inner circumference, and a coil extracting jig 11 employed with the pressing jig 10 and capable of pressing separately from the pressing jig 10. Also, rotator for rotating the position of the stator 1 such as a motor is provided, whereby the stator 1 is rotated relative to the pressing jig 10 and the coil extracting jig 11, so that the coil is pressed multiple times. The coil extracting jig 11 has a shape of pressing the coil 3 on both end faces of the iron core 2 at the same time, whereby the coil 3 is pressed by the coil extracting jig 11 while the outer circumferential face 2a of the iron core 2 is pressed by the pressing jig 10. Also, the stator 1 is preheated by heater such as a heating furnace.

As constituted above, in addition to the effects of the embodiment 1, the embodiment 2 has the effect that because the pressing jig 10 and the coil pressing jig 11 are used in combination, enlargement of the opening portion 4a and extraction of the coil 3 are made at the almost same time, resulting in the enhanced resolving efficiency. Also, by combining enlargement of the opening portion 4a and extraction of the coil 3 and rotation of the position of the stator 1, the coil 3 is likely to be extracted as a whole, resulting in the excellent yield and enhanced resolving efficiency. Also, the small resolving device with excellent resolving efficiency and yield is obtained. Moreover, the coil 3 is pressed multiple times, whereby the coil 3 is likely to be extracted, with small load, and the resolving device is reduced in size.

Since the stator 1 is preheated, the coating or varnish of the coil 3 is softened or burnt, so that the coil 3 is extracted easily and surely. Also, since heater such as a heating furnace is provided, the coil 3 is likely to be extracted, and the pressing load is decreased, whereby the resolving device is reduced in size, and constituted in line with the heating furnace, with the enhanced resolving efficiency. Moreover, the outer circumferential face 2a of the iron core 2 is pressed by the pressing jig 10 while the coil is pressed by the coil extracting jig 11, whereby the coil 3 is extracted by a required minimum pressure, so that the resolving device is reduced in size.

Embodiment 3

Figure 6A:
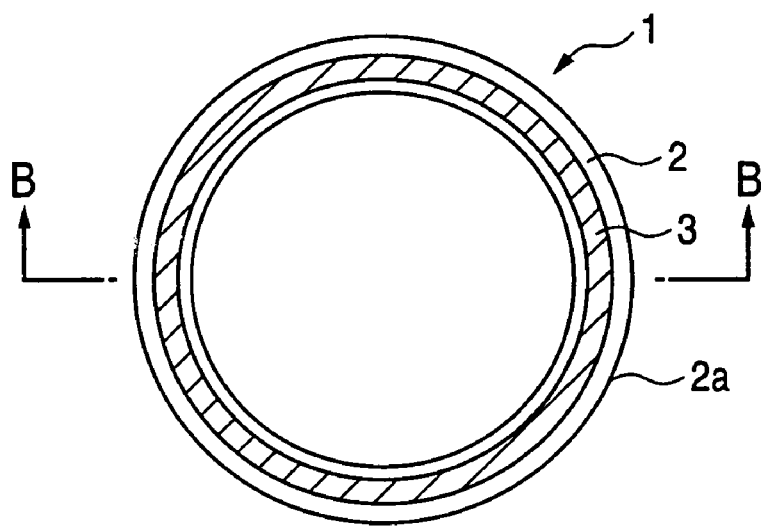
FIGS. 6A and 6B are explanatory views for explaining a step of dividing an iron core in a circumferential direction and extracting the coil from the slot and means according to an embodiment 3 of this invention.
Figure 6B:
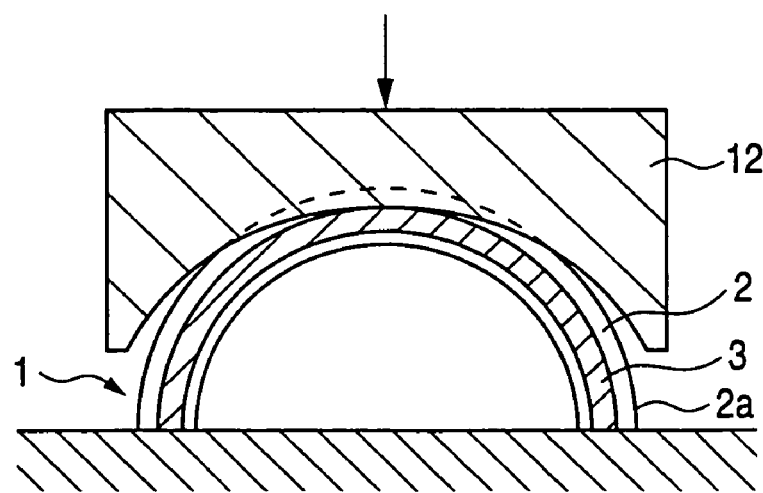

Referring to FIGS. 6A and 6B, an embodiment 3 of this invention will be described below. FIGS. 6A and 6B are explanatory view for explaining a step of dividing the iron core in a circumferential direction and extracting the coil from the slot and means. FIG. 6A is an explanatory view showing the stator 1 divided along the line B-B, and FIG. 6B is an explanatory view for explaining how to extract the coil 3 from the divided stator 1. As shown in FIG. 6A, the stator 1 is divided into two pieces along the line B-B, employing dividing section such as a cutter. Moreover, the divided stator 1 is placed, and the coil 3 is pressed by a coil extracting jig 12 as extracting section for extracting the coil 3 and then extracted from the stator 1, as shown in FIG. 6B.

As above constituted, the rigidity of the stator 1 is decreased, because the stator 1 is divided, whereby the coil 3 is extracted under a smaller pressure. Also, since the stator 1 is divided, the coil 1 is cut and more likely to be extracted. Accordingly, the resolving device with simple constitution and of small size is obtained. A heater such as a heating furnace may be provided, whereby the divided stator 1 is heated by the heater and then pressed by the coil extracting jig 12 to extract the coil 3 more easily, with smaller pressing load, whereby the resolving device is reduced in size. Moreover, the divided stator 1 as shown in FIG. 6B may be pressed by the press to take the shape of plane, and then the coil 3 may be extracted, whereby the coil 3 is extracted easily and the resolving device is constituted simply.

Embodiment 4

Figure 7:
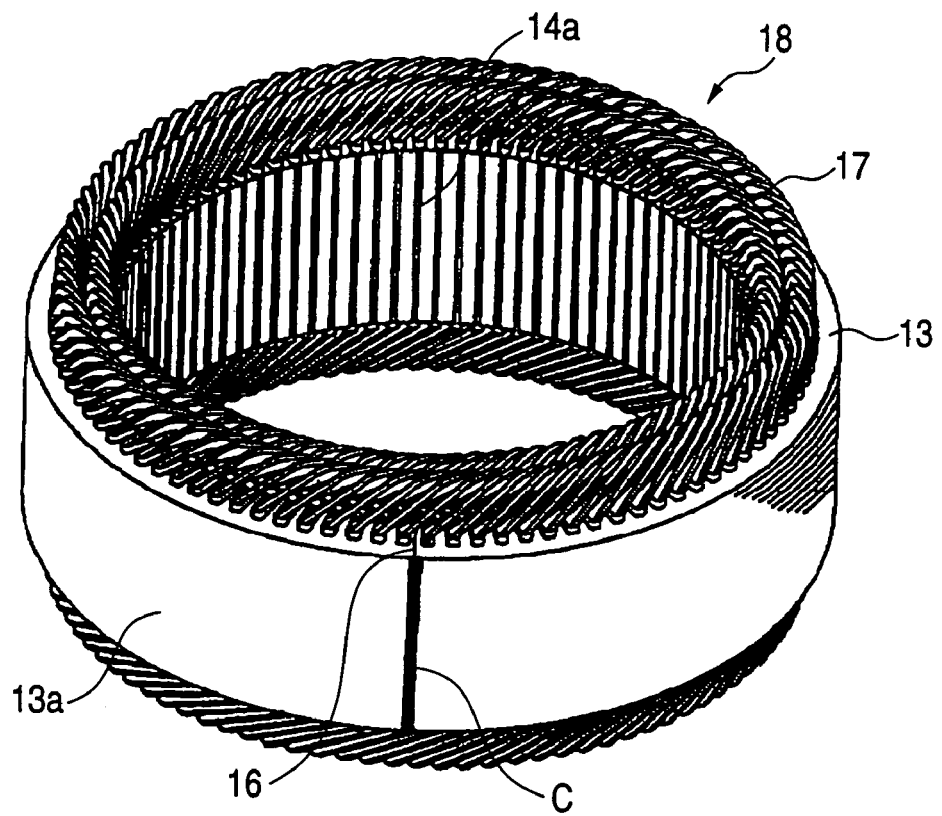
FIG. 7 is a perspective view of a stator in an AC dynamo for vehicle according to an embodiment 4 of this invention.
Figure 8:
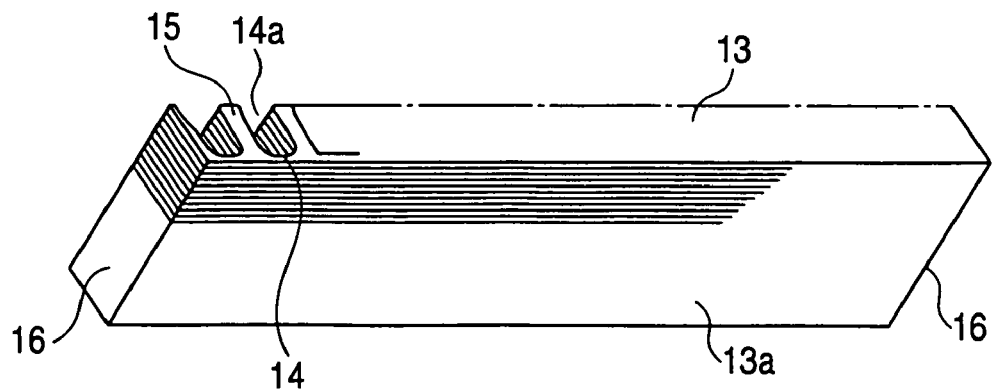
FIG. 8 is a perspective view of a strip iron core in the stator according to the embodiment 4 of this invention.
Figure 9:
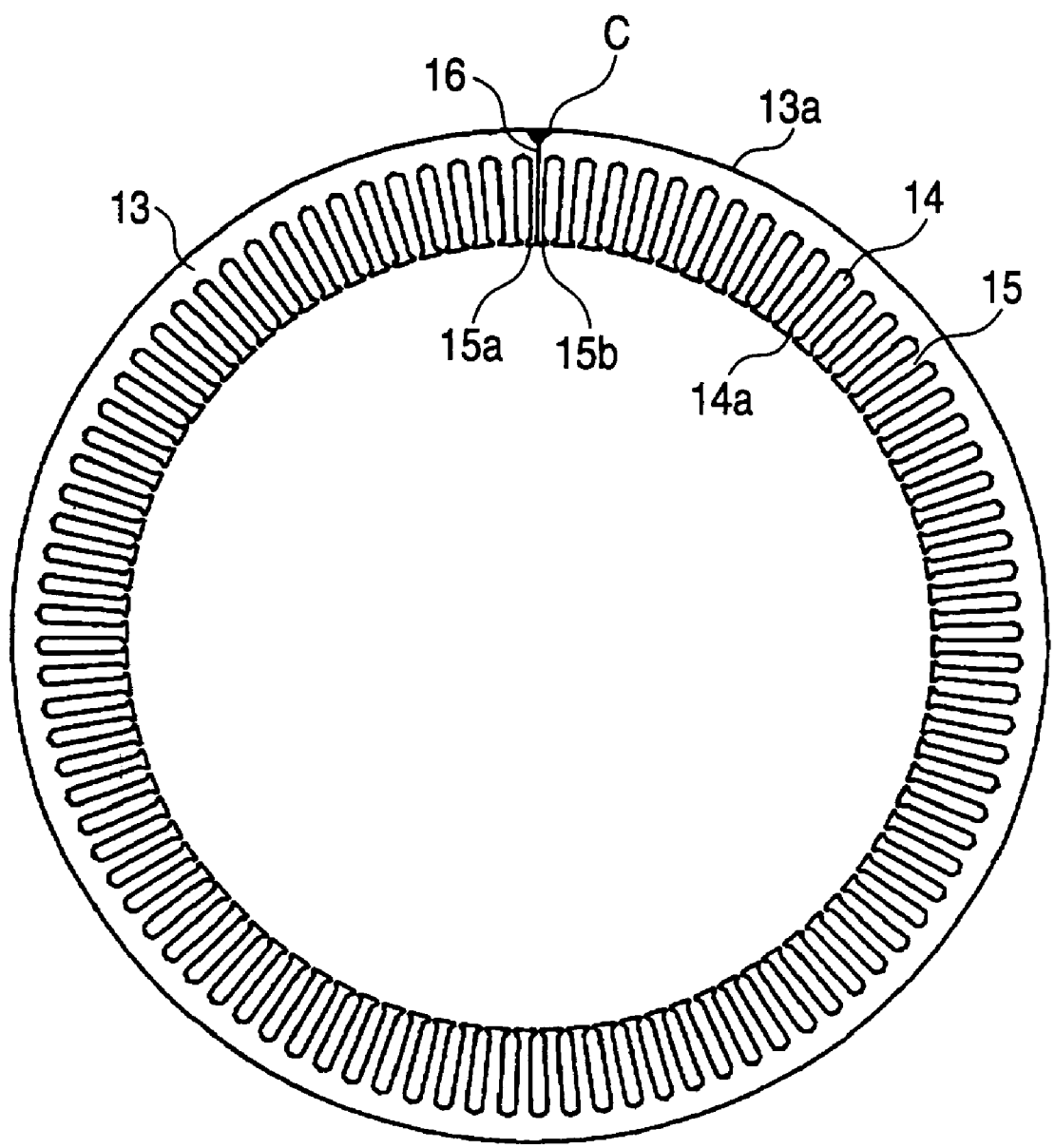
FIG. 9 is a front view of an iron core in the shape of annulus ring formed from the strip iron core according to the embodiment 4 of this invention.

Referring to FIGS. 7 to 14, an embodiment 4 will be described below. FIG. 7 is a perspective view of the stator in an AC dynamo for vehicle, FIG. 8 is a perspective view of a strip iron core, and FIG. 9 is a front view of the iron core in the shape of annulus ring formed from the strip iron core. In FIG. 8, the strip iron core 13 is constituted by forming a band plate having a plurality of slots 14 and teeth 15 from a strip steel plate using the press and laminating a plurality of band plates. The slot 14 of the iron core 13 have the opening portion 14a, and has an abutting surface 16 on both end faces of the strip iron core 13. A cylindrical stator 18 is constituted by disposing a coil 17 in the slots 14 of the strip iron core 13, forming the iron core 13 in the shape of annulus ring, partially welding the abutting surfaces 16, and making the varnish treatment, as shown in FIG. 7.

Figure 10:
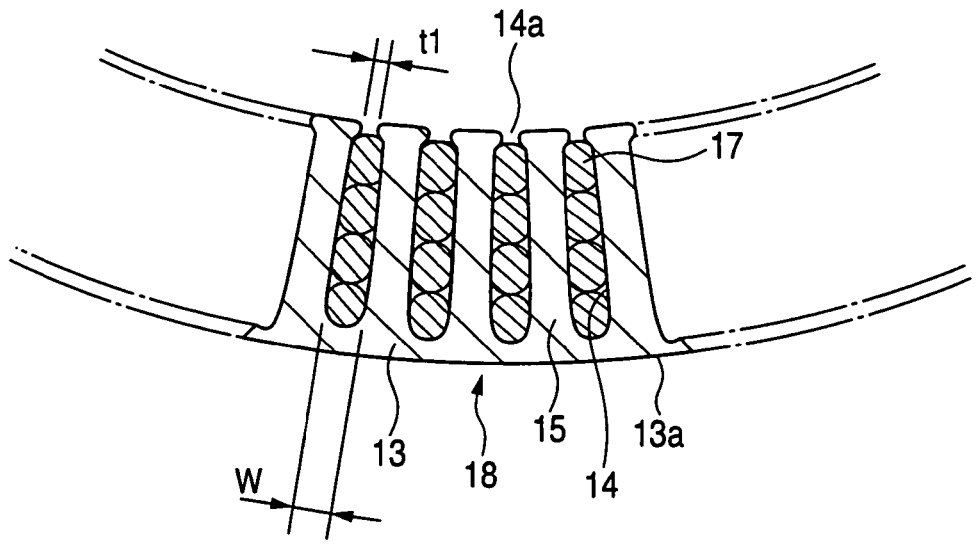
FIG. 10 is a partial cross-sectional view of a cylindrical stator according to the embodiment 4 of this invention.

In FIG. 9, the welding of the abutting surfaces will be described below. The abutting surfaces 16 are abutted with half teeth 15a and 15b, and welded axially at C point on the outer circumferential face 13a of the iron core 13. Therefore, the abutting surfaces 16 have a lower radial crushing strength than the other portions. In FIG. 9, the coil 17 is omitted for simplification. FIG. 10 is a partial cross-sectional view of the cylindrical stator. The stator 18 has the coil 17 disposed in the slots 14 as shown in FIG. 10, and impregnated with varnish. The opening size t1 of the opening portion 14a of the slot 14 is smaller than the width W of the coil 17.

Figure 11:
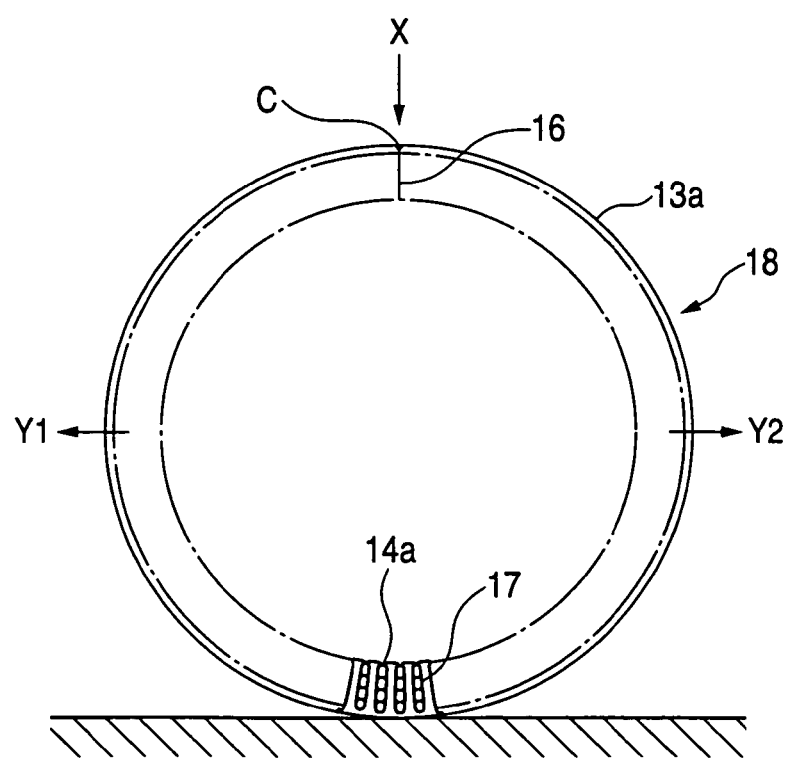
FIG. 11 is an explanatory view for explaining a step of dividing the iron core in the circumferential direction and dividing section according to the embodiment 4 of this invention.
Figure 12:
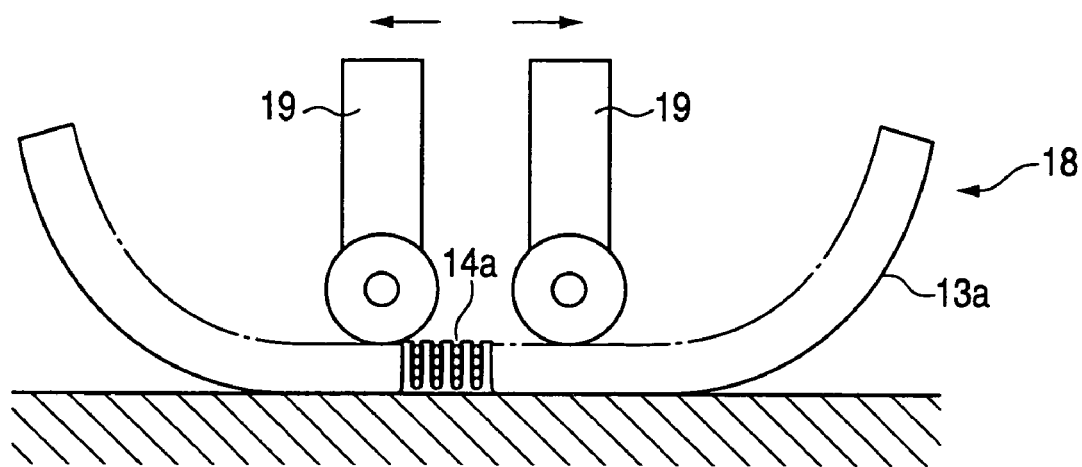
FIG. 12 is an explanatory view for explaining a step of enlarging an opening portion of slot and enlarging section according to the embodiment 4 of this invention.

FIG. 11 is an explanatory view for explaining a step of dividing the iron core in the circumferential direction and dividing section. In FIG. 11, the abutting surfaces 16 of the stator 18 are pressed in an X direction, in the Y1 or Y2 direction, or in the X direction and the Y1 and Y2 directions to constitute the dividing section. FIG. 12 is an explanatory view for explaining a step of enlarging the opening portion of slot and enlarging section. In FIG. 12, the rollers 19 as enlarging section are inserted into the divided stator 18, and moved under pressure, thereby forming at least a part of the outer circumferential face 13a of the iron core 13 like plane. Thereafter, the coil 17 is pressed and extracted, employing a jig like the coil extracting jig 9 of FIG. 2.

Figure 13:
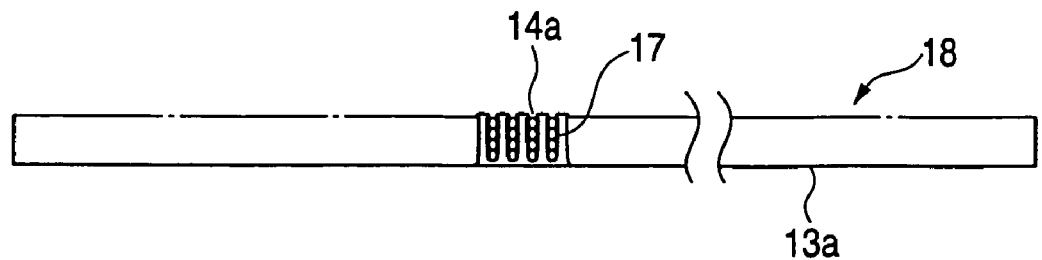
FIG. 13 is an explanatory view for explaining a stator formed like plane over the entire face according to the embodiment 4 of this invention.
Figure 14:
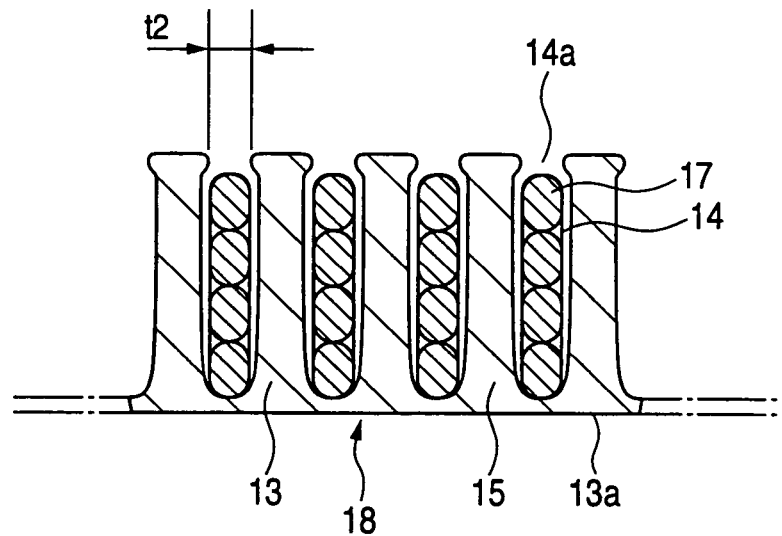
FIG. 14 is a partial cross-sectional view showing a part of the stator formed like plane according to the embodiment 4 of this invention.

FIG. 13 is an explanatory view for explaining a stator formed like plane over the entire face. The stator 13 of FIG. 12 is further formed like plane over the entire face by the press, and then the coil 17 is extracted by a coil extracting jig, not shown. FIG. 14 is a partial cross-sectional view showing a part of the stator formed like plane. By making the outer circumferential face 13a of the iron core 13 planar, the opening portion 14a of the slot 14 is enlarged (t2>t1). Also, even when the coil 17 is impregnated with varnish, the coil 17 is exfoliated from the iron core 13 along with the enlargement of the opening portion 14a.

As above constituted, the stator 18 in which the strip iron core 13 is disposed in the coil 17 and formed in the shape of annulus ring is easily divided along the abutting surfaces 16 under the pressure, because a portion with lower radial crushing strength is provided in a section of the iron core 13 in the circumferential direction by partially welding the abutting surfaces 16 of the iron core 13, whereby it is possible to produce the stator 18 for the coil 17 is easily resolved. Though the abutting surfaces 16 on the side of the outer circumferential face 13a of the iron core 13 are welded, the surface portion on the side of the inner circumferential face may be welded though it is degraded in the radial crushing strength as compared with the other portion. Because of this portion having lower radial crushing strength, the coil is likely to be resolved even after the varnish treatment, whereby the stator 18 having excellent heat resistance and vibration resistance is produced.

Since the stator 18 is divided, the stator 18 has a lower rigidity, whereby the coil 17 is easily extracted. Also, the coil 17 is cut, and is likely to be extracted. Since the iron core 13 is divided at one position in the circumferential direction, the coil 17 is easily divided, whereby there is an insignificant loss in the yield. Accordingly, the resolving device has a simple constitution, and is reduced in size. The stator may be divided at one position using cutting section such as a cutter. By making the outer circumferential face 13a of the iron core 13 planar, the opening portion 14a of the slot 14 is enlarged to allow the coil 17 to be easily extracted. Due to dividing, the opening portion 14a is easily enlarged. In the case where the stator 18 has a smaller size of the opening portion 14a or a large amount of varnish impregnation, the opening portion 14a may be enlarged in the direction of further enlarging the opening portion 14a. Because the enlarging section for enlarging the opening portion 14a is provided, the coil 17 is likely to be extracted, whereby the resolving device is reduced in size.

Embodiment 5

Figure 15:
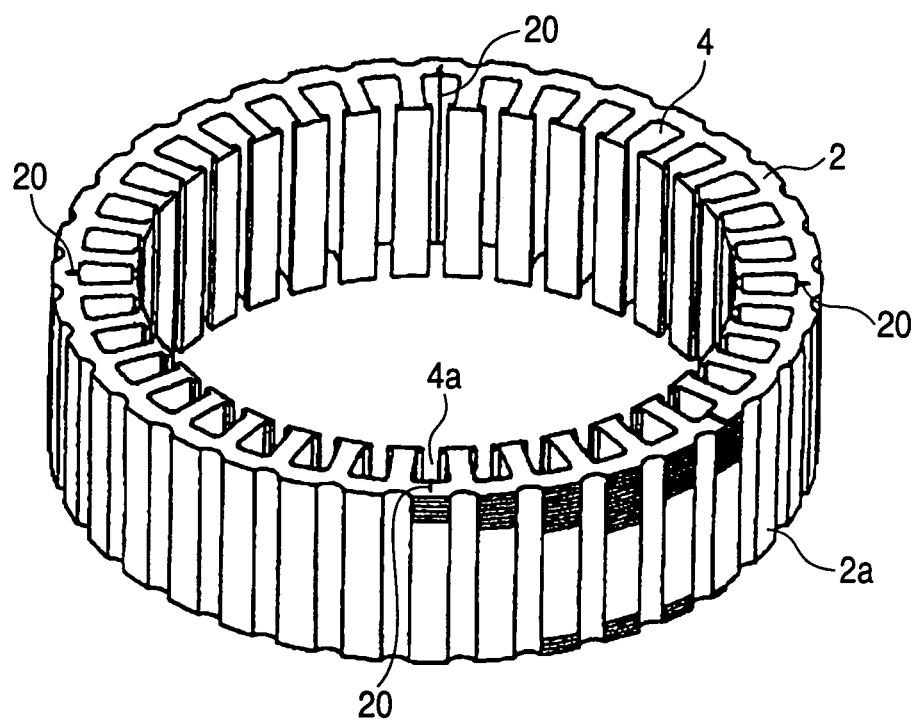
FIG. 15 is a perspective view of an iron core according to an embodiment 5 of this invention.
Figure 16:
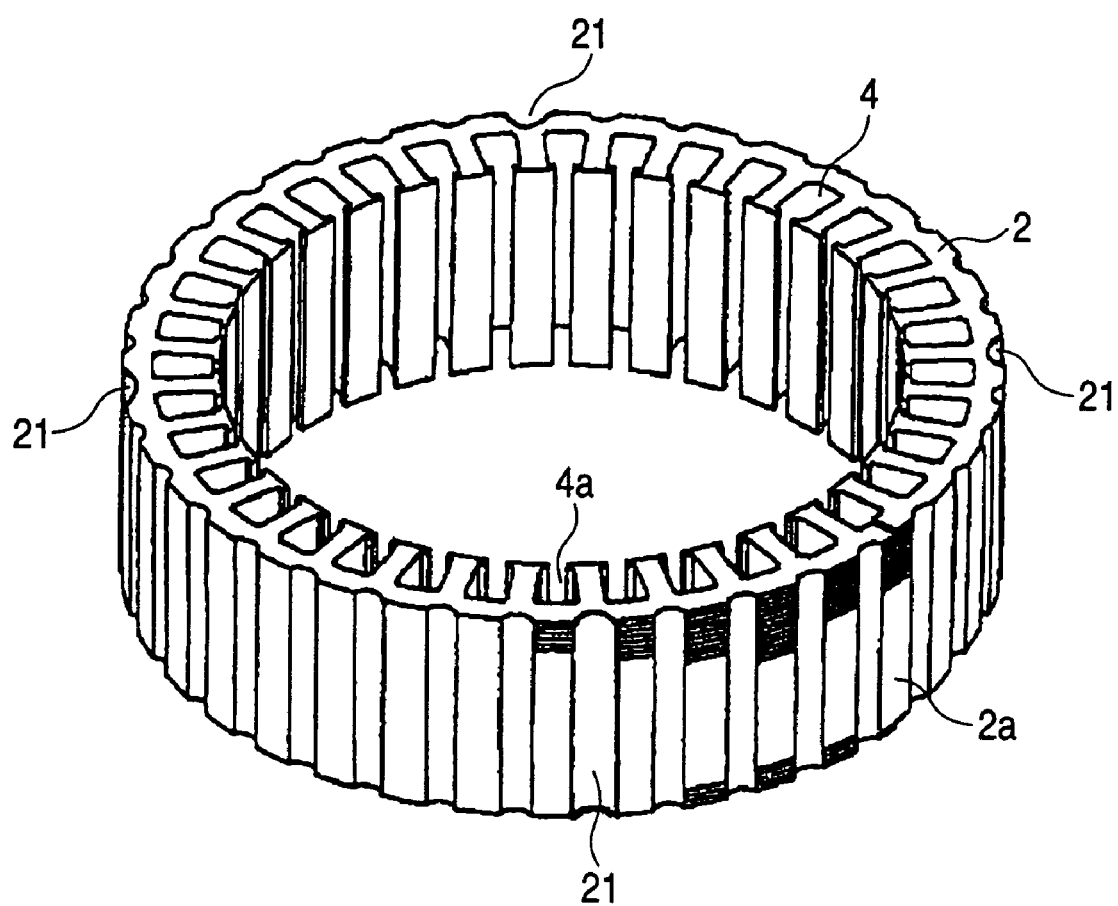
FIG. 16 is a perspective view of the iron core according to the embodiment 5 of this invention.

Referring to FIGS. 15 and 16, an embodiment 5 of this invention will be described below. FIGS. 15 and 16 are the perspective views of the iron core. FIG. 15 is different from FIG. 16 in that the iron core 2 has a notch portion 20. The notch portion 20 is provided as a linear slit when a band plate is cut out from the strip steel plate, and the band plate is wound helically and formed cylindrically, so that the slits are abutted as shown in FIG. 15, whereby the notch portion 20 without gap is made at four positions at an interval of 90 degrees. In FIG. 16, the concave portion 7 of the iron core 2 is made larger at four positions at an interval of 90 degrees than the iron core 2 of FIG. 4. The larger concave portion 21 is provided than other portion when a band plate is cut out from the strip steel plate, and the band plate is wound helically and formed cylindrically, whereby the larger concave portion 21 is provided at four positions at an interval of 90 degrees, as shown in FIG. 16.

As above constituted, each of the notch portion 20 and the concave portion 21 has a portion of the iron core 2 with lower radial crushing strength in the circumferential direction than other portion, and this portion is easily deformed by pressing the outer circumferential face 2a of the stator 1 using this iron core 2 as shown in FIG. 3, so that the opening portion 4a of the slot 4 is enlarged due to a smaller pressure, whereby the stator 1 for which the coil 3 is easily resolved is produced. Because of the portion with lower radial crushing strength, the coil is likely to be resolved against the varnish treatment, whereby the stator 18 having excellent heat resistance and vibration resistance is obtained. A front bracket and a rear bracket, not shown, are fitted with both axial faces of the iron core 2 and secured through four through bolts (not shown). If the through bolt and the notch portion 20 or concave portion 21 are aligned, there is no practical problem in the decrease of radial crushing strength, and especially because the concave portion 21 is increased in size, the through bolt is placed inward diametrically, whereby the stator 1 is fixed more securely, and the device is reduced in size.

Though the AC dynamo for vehicle has been described by way of example, this invention is widely applicable to the stator for the driving motor for vehicle or the stator for the motor generator.

As above described, the present invention provides a stator having a coil disposed in the slots provided around an inner circumferential face of a cylindrical iron core and having an opening portion, characterized in that a portion with a lower radial crushing strength is provided in at least a part of the iron core in a circumferential direction. Therefore, it is possible to produce the stator in which the coil is easily resolved, because the iron core is easily deformed in the portion with lower radial crushing strength. Also, it is possible to produce the stator treated with varnish that is excellent in the heat resistance or vibration resistance, in which the coil is easily resolved.

Also, this invention provides a method for resolving a stator having a coil disposed in the slots provided around an inner circumferential face of a cylindrical iron core and having an opening portion, characterized by including a step of enlarging the opening portion of the slot, and a step of extracting the coil from the slot. Therefore, the opening portion of slot is enlarged so that the coil is easily extracted. In the stator treated with varnish, the coil is easily extracted.

Also, this invention provides a method for resolving a stator having a coil disposed in the slots provided around an inner circumferential face of a cylindrical iron core and having an opening portion, characterized by including a step of dividing the iron core in a circumferential direction, and a step of extracting the coil from the slot. Therefore, the stator has a lower rigidity due to dividing, so that the coil is easily extracted. Also, since the coil is cut out, the coil is easily extracted.

Also, this invention provides a device for resolving a stator having a coil disposed in the slots provided around an inner circumferential face of a cylindrical iron core and having an opening portion, characterized by comprising enlarging section for enlarging the opening portion of the slot, and extracting section for extracting the coil from the slot. Therefore, the opening portion of slot is enlarged, so that the coil is easily extracted, whereby the small-sized resolving device can be produced with excellent resolving efficiency and yield. In the stator treated with varnish, the coil is easily extracted.

Also, this invention provides a device for resolving a stator having a coil disposed in the slots provided around an inner circumferential face of a cylindrical iron core and having an opening portion, characterized by comprising dividing section for dividing the iron core in a circumferential direction, and extracting section for extracting the coil from the slot. Therefore, the stator has a lower rigidity due to dividing. Further, since the coil is cut out, the coil is easily extracted. Consequently, the small-sized resolving device can be produced with excellent resolving efficiency and yield.

What is claimed is:

1. A method for resolving a stator, the stator comprising: a cylindrical iron core; a plurality of slots that are provided around an inner circumferential face of the cylindrical iron core, each slot including an opening portion; and a coil disposed in the slots, the method comprising:
    enlarging the opening portion of the slot by pressing the cylindrical iron core; and
    extracting the coil from the slot,
    wherein enlarging the opening portion of the slot includes forming at least a part of an outer circumferential face of the iron core in the shape of a plane.

2. The method for resolving the stator according to claim 1, further comprising: relatively rotating the position of the stator.

3. The method for resolving the stator according to claim 1, wherein extracting the coil includes pressing the coil on both end faces of the iron core at the same time.

4. The method for resolving the stator according to claim 1, further comprising: heating the stator.

* * * * *